United States Patent [19]
Yamamoto et al.

[11] Patent Number: 4,802,045
[45] Date of Patent: Jan. 31, 1989

[54] RECORDING TAPE CARTRIDGE

[75] Inventors: Osamu Yamamoto, Takatsuki; Shigeo Sasaki; Shinichi Kagano, both of Kyoto, all of Japan

[73] Assignee: Hitachi Maxell, Ltd., Osaka, Japan

[21] Appl. No.: 840,866

[22] Filed: Mar. 18, 1986

[30] Foreign Application Priority Data

Mar. 18, 1985 [JP] Japan ................. 60-39357[U]

[51] Int. Cl.[4] ........................................... G11B 23/02
[52] U.S. Cl. .................................................. 360/132
[58] Field of Search ................ 360/132; 242/197-200

[56] References Cited

U.S. PATENT DOCUMENTS 3,642,228  2/1972  Tollkuhn .................. 360/132 X
4,475,222  10/1984  Egendorf .................. 360/132 X Primary Examiner—A. J. Heinz
Attorney, Agent, or Firm—Birch, Stewart, Kolasch & Birch

[57] ABSTRACT

In a tape cartridge of the Philips type, one or more ribs are projected from a main plate of each case half at regions except for the tape chamber and the tape path so as to conform to one or more flow lines of resin when each half of molded, the cartridge is so that the formation of traces of resin can be prevented, resulting in an increase in mechanical strength of the cartridge.

6 Claims, 3 Drawing Sheets

RECORDING TAPE CARTRIDGE

BACKGROUND OF THE INVENTION

1. FIELD OF THE INVENTION

The present invention relates to a recording taps cartridge and more particularly to an arrangement for preventing deformation of the recording tape cartridge.

2. DESCRIPTION OF THE RELATED ART

Recording tape cartridges so called compact cassettes or philips type tape cassettes are usually formed of plastic resin materials using resin injection molding. FIGS. 1 and 2 show one example of a conventional recording tape cartridge of the above type in which a cartridge case 1 is formed by assembling a bottom half 1a and a top half 1b in a butting manner and both of the halves are connected together by screws. Both of the halves 1a and 1b are formed almost in a similar shape having a front wall 2, side walls 3 and rear wall 4 each projected from a main plate 1x. A pair of drive shaft insertion holes 7a are defined in the main plate 1x with a predetermined interval and a window 7b of a square shape is defined between the drive shaft insertion holes 7a so as to see the amount of the roll of recording tape 5 wound on respective tape hubs 6 rotatably mounted on the drive shaft insertion holes 7a. A head insertion opening 8 is defined on the central portion of the front wall 2. A partition wall 10 is formed extending in a lateral direction or in a direction towards both side walls 3 of the case 1 at the inside of the half 1a (or 1b) so as to separate the head insertion window 8 and a tape chamber 9. Each pairs of tape guide members 11, 12 and 13 are provided symmetrically on the main plate 1x between the front wall 2 and the partition wall 10 along a tape path.

In molding the respective top and bottom halves 1a and 1b, it is necessary to form particularly the respective tape guide members 11, 12 and 13 in the front portion of the case 1 with a high precision of molding. Therefore, usually an injection gate G for injecting plastic resin into a mold is provided near the front side of each of the halves. In case plastic resin is injected into the mold through the gate G, the paths of the injected plastic resin flow in the mold generally are shown by lines A in FIG. 2 and there tends to occur resin orientation. In addition, recently there has developed a strong requirement of decreasing thickness of the respective walls of the cartridge and high cycle molding and therefore, the work of injection of the cartridge must be made with high speed, whereby the resin orientation would be promoted.

Furthermore the resin flow, as shown by the lines A flowing along the drive shaft insertion holes 7a and the window 7b, meets together after the resin flows pass the drive shaft insertion holes and window. As a result, there tends to be undesirably formed weld marks W, as shown in FIG. 2, and therefore, in case the cartridge having the weld mark and/or resin orientation is put under high temperature, the cartridge is easily bent or twisted at the position where the resin orientation and/or weld marks are strong. Particularly bending of the cartridge along the flow of the resin easily occurs. If the tape cartridge is undesirably bent or twisted the parallelism and flatness of the cartridge are harmed, whereby tape running becomes unstable and the recording and reproducing characteristics of the tape cartridge are badly affected.

Japanese Utility Model Publication 153685/1984 disclosure providing a number of ribs in a tape cartridge for the purpose of increasing the mechanical strength of the tape cartridge, but there is no contrivance of improving the resin flow to eliminate the resin orientation and weld marks.

SUMMARY OF THE INVENTION

An essential object of the present invention is to provide a recording tape cartridge which is able to assure correct tape running and to increase the mechanical strength of the tape cartridge even when the cartridge case is produced under high speed injection with decreased thickness of the respective walls of the cartridge case.

According to the present invention there is provided a tape cartridge comprising a top half and a bottom half, each half including a main plate and surrounding walls formed on the peripheral edges of the main plate, the top half and bottom half being assembled together to provide a cartridge case having a tape chamber in which a recording tape is accommodated and a tape path through which the recording tape is passed, wherein the improvement comprises providing one or more ribs projecting from the main plate of each half at regions, except for the tape chamber and the tape path, so as to conform to one or more flow lines of resin when each half is molded.

Each of the ribs serves to enhance the mechanical strength of the top half and bottom half and prevents deformation of each half along the weld marks or resin flow lines formed during molding. Accordingly, even if the tape cartridge is produced by high cycle molding with decreased thickness of the respective walls, tape cartridges having a high precise degree of parallelism and flatness of the cartridge case can be assured.

DETAILED DESCRIPTION OF THE PREFERRED EMBODIMENTS

Figure 1:
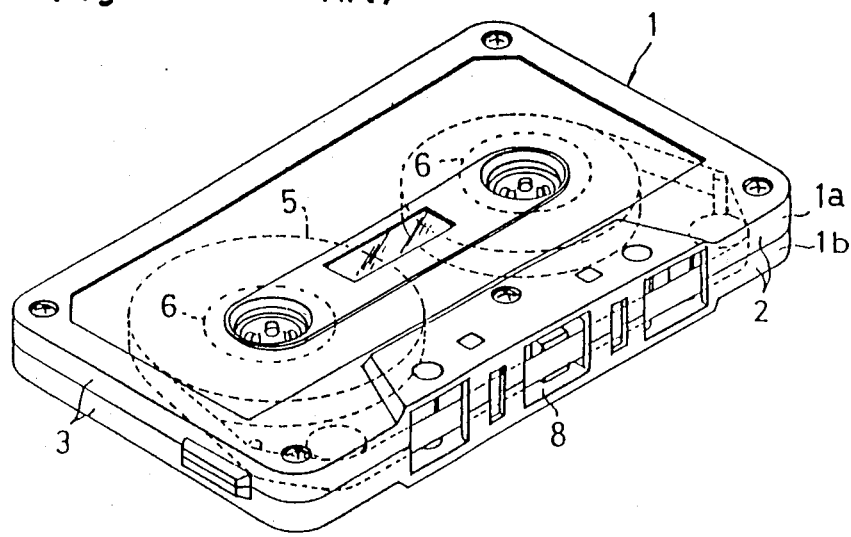
FIG. 1 is a perspective view of a conventional tape cartridge.
Figure 2:
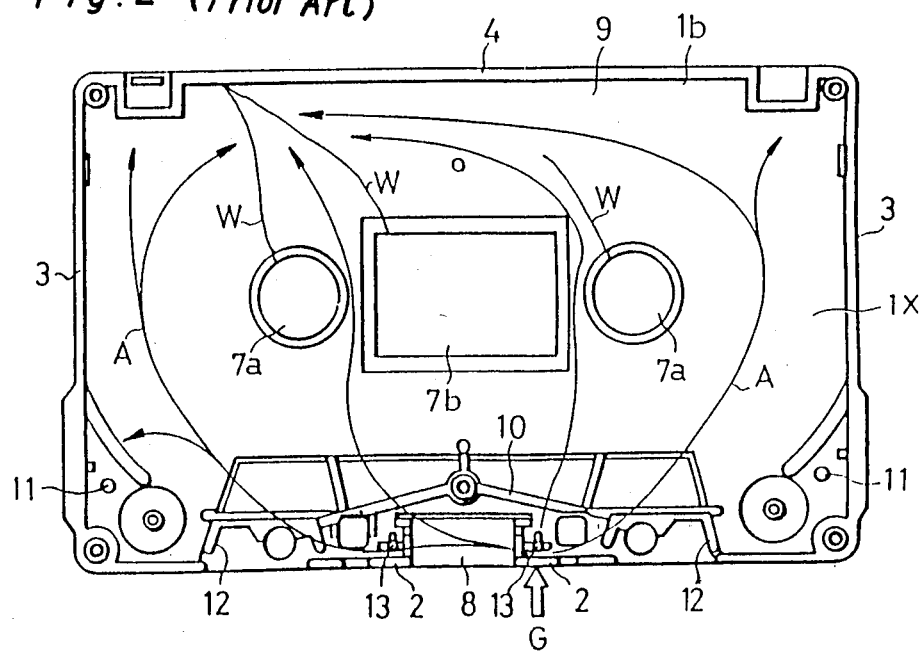
FIG. 2 is a top plan view of a bottom half of the tape cartridge shown in FIG. 1.
Figure 3:
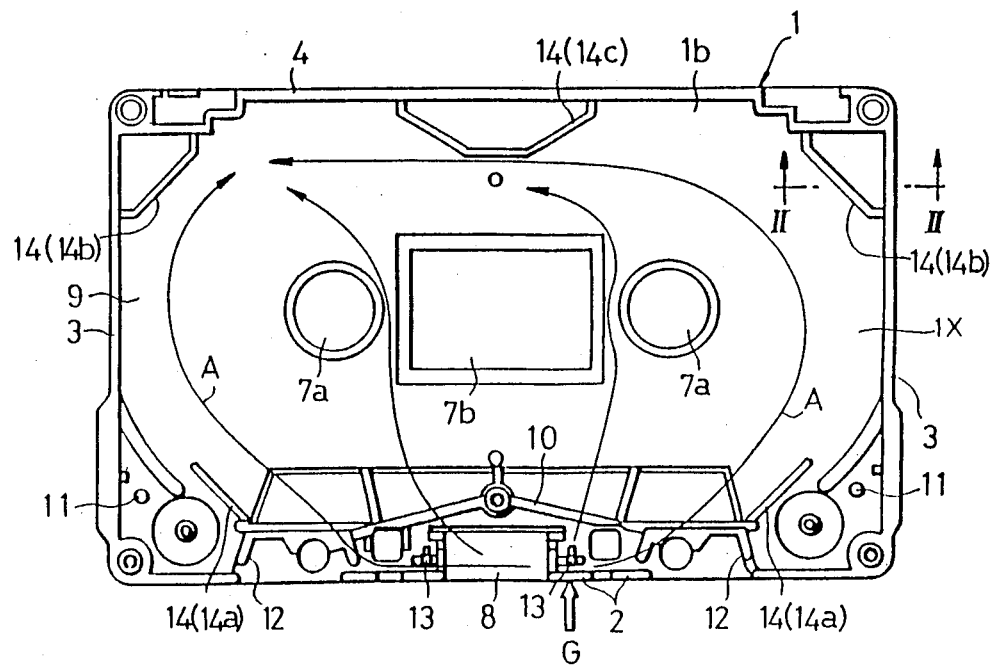
FIG. 3 is a top plan view of a bottom half of an embodiment of the tape cartridge according to the present invention.
Figure 4:
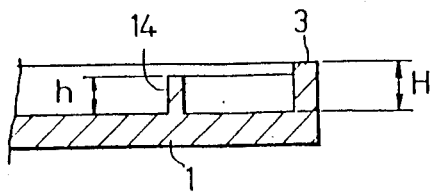
FIG. 4 is a partial cross sectional view taken along the line II—II.
Figure 5:
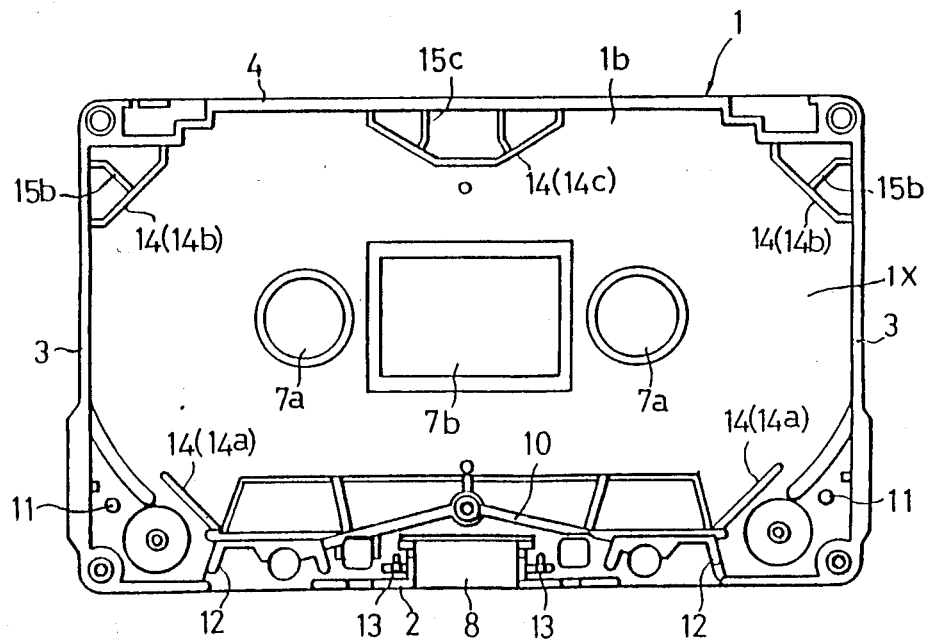
FIG. 5 is a top plan view of a bottom half of another embodiment of the tape cartridge according to the present invention.

Before the description proceeds, it is noted that throughout the attached drawings like parts are designated with like reference numerals and the details of the respective like parts already mentioned in the foregoing are applied to those in the embodiment shown in FIGS. 3 to 5.

Referring to FIG. 3, there are provided a plurality of ribs 14 on the main wall 1x standing vertically in positions except for the tape chamber 9 and tape running region. These ribs 14 are formed to generally conform to the resin flow lines at the time of injection molding of the bottom half 1b or top half 1a. For example, in case the resin injection is performed through a gate G provided at a point on the central part of the front wall 2, a pair of front side ribs 14a are formed so as to extend slanted rearwardly and towards the side walls 3 from the respective ends fo the tape guide member 12 and another pair of ribs 14b are formed across the side walls 3 and the rear wall 4 at the respective rear corners of the top half 1a and bottom half 1b. A further rib 14c is formed on both the top half 1a and the bottom half 1b from the intermediate portions of the respective rear walls 4 so as to extend frontward or towards the tape chamber 9. It is desired that the ribs 14a, 14b and 14c are respectively integrally connected to the guide members, side walls or rear wall to enhance the mechanical strength of the halves 1a and 1b. Although the higher the ribs, the stronger the mechanical strength of the halves 1a and 1b, in case the ribs are too high, a large trimming angle is required for the mold, and, as a result, the width of the foot portion of the ribs becomes large, whereby there occurs a problem of occurrence of trace marks. In case the ribs are formed at the same height of the walls 3 and 4, the ribs tend to excessively project from the top of the walls 2, 3 and 4 due to the production error of the size of the mold, so that a gap may be produced between the butting surfaces of the walls 2, 3 and 4 of the top half 1a and bottom half 1b and the parallelism and flatness between the top half 1a and bottom half 1b are harmed. Therefore, the height h (see FIG. 4) of the ribs 14a and 14b are decided such that the ribs 14a and 14b are slightly lower than the walls 2, 3 and 4. In the preferred embodiment, the ribs 14a and 14b are made lower by 0.1 to 0.6 mm than the rear wall 4 which is 2.6 mm high.

The ribs 14a may be formed from a position near both ends of the partition wall 10.

Referring to FIG. 5, additional ribs 15b and 15c are formed across the intermediate position of each of the ribs 14b, 14c and each of the side walls 3 and rear wall 4 to enhance the mechanical strength of the ribs 14b and 14c.

The arrangement of the ribs 14a to 14c and 15b and 15c, as shown in FIGS. 3 and 5, can be applied to the tape cartridge in case the resin injection gate is provided on one of the side walls.

It is noted that various modifications may be made by those skilled in the art without departing from the scope of the present invention.

What is claimed is:

1. A tape cartridge case comprising a top half and a bottom half, each half including a main plate, surrounding walls formed on peripheral edges of said main plate, said surrounding walls including a front wall in which a head insertion opening is formed, a rear wall formed parallel to said front wall and side walls, said top half and bottom half being assembled together to provide said cartridge case having a tape chamber in which a recording tape is accommodated and a tape path through which said recording tape passes, a partition wall formed at each respective front wall of each half along said tape path facing to said head insertion opening, a pair of tape guide members juxtapositioned to each end of said respective partition wall, a pair of front-side ribs extending slantingly rearward towards said side walls from respective ends of said tape guide members and a side-rear corner rib at each rear corner of each half extending between the corresponding side wall and rear wall, such that said ribs are integral with and project from said main plate of each half of the defined regions avoiding said tape chamber and tape path, disposed so as to conform to one or more flow lines of injected resin when said resin is injected to mold each half of said tape cartridge.

2. The tape cartridge according to claim 1, wherein each of said side-rear corner ribs further comprises an additional rib for reinforcing said respective side-rear corner rib formed at an intermediate position of each of said ribs and extending to said respective side wall.

3. The tape cartridge of claim 1, wherein said ribs are lower in height than said surrounding walls.

4. The tape cartridge according to claim 3, wherein said ribs are made so as to be from 0.1 to 0.6 mm lower than the height of said rear wall.

5. The tape cartridge according to claim 1, further including an intermediate rib on each half positioned at an intermediate portion of said respective rear wall.

6. The tape cartridge according to claim 5, wherein said intermediate rib further includes at least one additional rib for reinforcing said intermediate rib extending from a front portion of said respective intermediate rib to the rear wall of said respective cartridge half.

* * * * *